US012651918B2

(12) United States Patent     (10) Patent No.:   US 12,651,918 B2

Ke et al.     (45) Date of Patent:    Jun. 9, 2026

(54) MOBILE POWER SUPPLY DEVICE

(71) Applicant: ZHEJIANG LERA NEW ENERGY POWER TECHNOLOGY CO., LTD, Ningbo (CN)

(72) Inventors: Hengzhao Ke, Ningbo (CN); Jianhong Dai, Ningbo (CN)

(73) Assignee: ZHEJIANG LERA NEW ENERGY POWER TECHNOLOGY CO., LTD, Ningbo (CN)

( * ) Notice: Subject to any disclaimer, the term of this patent is extended or adjusted under 35 U.S.C. 154(b) by 812 days.

(21) Appl. No.: 18/017,088

(22) PCT Filed: Jul. 21, 2021

(86) PCT No.: PCT/CN2021/107553

§ 371 (c)(1),
(2) Date: Jan. 20, 2023

(87) PCT Pub. No.: WO2022/022353

PCT Pub. Date: Feb. 3, 2022

(65) Prior Publication Data

US 2023/0299599 A1     Sep. 21, 2023

(30) Foreign Application Priority Data

| Jul. 27, 2020 | (CN) | .......................... | 202021506766.4 |
| Jul. 27, 2020 | (CN) | .......................... | 202021506770.0 |
| Jan. 11, 2021 | (CN) | .......................... | 202110029806.3 |

(51) Int. Cl.
    *H02J 7/00*       (2026.01)
    *H01M 10/42*      (2006.01)
    *H02J 7/70*       (2026.01)

(52) U.S. Cl.
CPC .......... *H02J 7/70* (2026.01); *H01M 10/4257* (2013.01); *H02J 7/855* (2026.01); *H01M 2010/4278* (2013.01)

(58) Field of Classification Search
CPC .......................... H02J 7/0042; H01M 10/4257
See application file for complete search history.

(56) References Cited

U.S. PATENT DOCUMENTS

| 10,547,340 | B1 * | 1/2020 | Daghighian | ......... H04B 1/3883 |
| 2004/0257035 | A1 | 12/2004 | Chang | |
| 2016/0049818 | A1 * | 2/2016 | Yao | .................. G06K 19/06037 |
| | | | | 320/103 |

FOREIGN PATENT DOCUMENTS

| CN | 203632306 | U | 6/2014 |
| CN | 110649668 | A | 1/2020 |
| CN | 210349932 | U | 4/2020 |
| CN | 210724241 | U | 6/2020 |
| CN | 112865492 | A | 5/2021 |

* cited by examiner

*Primary Examiner* — Robert Grant

(74) *Attorney, Agent, or Firm* — Bayramoglu Law Offices LLC

(57) ABSTRACT

A mobile power supply device includes a housing; a cell and a circuit board that are arranged in the housing; and a data line. One end of the data line is electrically connected to the circuit board and is fixedly connected to the housing. The housing has at least one flat surface. The data line is suitable for being flexibly bent and is at least partially embedded in the flat surface in a U-shape or an S-shape. The mobile power supply device with the structural design is convenient to use and carry.

24 Claims, 7 Drawing Sheets

MOBILE POWER SUPPLY DEVICE

CROSS REFERENCE TO THE RELATED APPLICATIONS

This application is the national phase entry of International Application No. PCT/CN2021/107553, filed on Jul. 21, 2021, which is based upon and claims priority to Chinese Patent Applications No. 202021506766.4, filed on Jul. 27, 2020; No. 202021506770.0, filed on Jul. 27, 2020; and No. 202110029806.3, filed on Jan. 11, 2021, the entire contents of which are incorporated herein by reference.

TECHNICAL FIELD

The present invention relates to a mobile power supply device.

BACKGROUND

The mobile power supply includes multiple batteries with high energy density and overall capacity. The housing is provided with a charging interface and one or more discharge interfaces, which can be used for repeated charge and discharge. The charging interface can be connected to the power outlet to charge the mobile power supply through the universal serial bus (USB) data line and the ordinary charging socket. The discharge interface can be connected to the portable electronic device by the USB data line to charge the portable electronic device. Through the USB data lines of different interface forms, the mobile power supply can charge various portable electronic devices. In addition, the mobile power supply has a compact size, is easy to carry, and is used frequently in people's daily life.

SUMMARY

The purpose of the present invention is to provide a mobile power supply device that is convenient to use and carry.

The present invention provides a mobile power supply device, which includes:

a housing;

a cell and a circuit board that are arranged in the housing; and a data line. One end of the data line is electrically connected to the circuit board and is fixedly connected to the housing.

The housing has at least one flat surface.

The data line is suitable for being flexibly bent and is at least partially embedded in the flat surface in a U-shape or an S-shape.

Further, adjacent segments of a curved part of the data line are parallel to each other.

Further, the center spacing L of the adjacent segments of the curved part of the data line is at least 3 mm.

Further, the center spacing L of the adjacent segments of the curved part of the data line is no more than 9 mm.

Further, the width of the circuit board is Y, and the diameter of the cell is D, where Y is less than or equal to 95% of D.

Further, the length of the cell is L3, and the length of the mobile power supply device is L4, where L4 is less than or equal to 1.3 times L3.

Further, the diameter of the cell is D, and the height of the mobile power supply device is M, where M is less than or equal to 1.8 times D.

Further, the diameter D of the cell is 21 mm, and the length L3 is 70 mm.

Further, the data line includes an interface end, and the interface end at least includes a type-c interface. When the type-c interface is embedded in the flat surface, a socket direction of the type-c interface is parallel to a long-axis direction of the housing.

Further, the interface end includes at least one Lightning interface, and the Lightning interface is oppositely arranged to the type-c interface. When the type-c interface and the Lightning interface are embedded in the flat surface, a central axis line of the two is parallel to the long-axis direction of the housing.

Further, the housing is provided with a groove corresponding to the data line. After the data line is embedded in the groove, the upper surface of the data line is basically flush with the flat surface.

Further, the housing is provided with the groove corresponding to the data line. One end of the data line fixedly connected to the housing is provided with a connector. A part of the connector is embedded in the groove to form a part surface of the flat surface.

Further, the adjacent segments of the curved part of the data line extend linearly along the long-axis direction of the housing.

Compared with the prior art, the advantages of the present invention are as follows:

The technical solution comes with a data line that is at least partially embedded in the flat surface of the housing in a U-shaped or S-shaped. The data line is suitable for being flexibly bent, which allows the data line to be arranged in a limited layout space and is convenient for users to carry and use.

Another purpose of the present invention is to provide a mobile power supply device that can be latched and connected to an electrical operation tool to supply power to the electrical operation tool and comes with a data line for the power supply.

The present invention provides a mobile power supply device, which includes:

a housing;

a cell and a circuit board that are arranged in the housing;

latch slots that are suitable for the latch connection to an electrical operation tool; and a data line. One end of the data line is electrically connected to the circuit board.

The housing has at least one flat surface.

The data line is suitable for being flexibly bent and is at least partially embedded in the flat surface, and the latch slots are located on the flat surface.

Further, the latch slots include a first latch slot and a second latch slot.

The first latch slot is suitable for a latch connection to a first electrical device.

The second latch slot is suitable for a latch connection to a second electrical device.

When the first latch slot and the second latch slot are latched and connected to the electrical devices corresponding to the first latch slot and the second latch slot, the two do not interfere with each other.

Further, the data line includes an interface end, and the interface end includes at least one USB interface. The housing is provided with a groove corresponding to the interface end, and the groove is communicated with a latch slot adjacent to the groove.

Further, the length direction of the latch slot is perpendicular to the length direction of a groove adjacent to the latch slot.

Further, the first latch slot and the second latch slot are distributed at two opposite ends of the flat surface, respectively.

Compared with the prior art, the advantages of the present invention are as follows: On the one hand, the technical solution provides a data line that includes the USB interface, which can be used for computer, communication, and consumer electronics (3C) classes, such as mobile phones, earphones, and other electrical devices for power supply. On the other hand, the technical solution provides latch slots that are suitable for the latch connection to the electrical operation tool. When the electrical operation tool is latched and connected, the tool discharge terminals that are configured in the mobile power supply device match the electrical operation tool to supply power to the electrical operation tool.

Another purpose of the present invention is to provide a mobile power supply device that can be latched and connected to an electrical operation tool to supply power to the electrical operation tool, includes a data line for the power supply, and has a reasonable layout.

The present invention provides a mobile power supply device, which includes:

a housing;

a cell and a circuit board that are arranged in the housing;

tool discharge terminals that are electrically connected to the circuit board and are suitable for a connection to corresponding terminals of an electrical operation tool; and a data line. One end of the data line is electrically connected to the circuit board.

The housing has at least one flat surface.

The data line is suitable for being flexibly bent and is at least partially embedded in the flat surface.

An area that the data line is embedded in is arranged away from the tool discharge terminals.

Further, the flat surface is provided with opposite end A and end B along the length direction of the flat surface, the data line is arranged near the end A, and the tool discharge terminals are arranged on a side adjacent to the end B.

Further, the tool discharge terminals include at least positive and negative terminals and are suitable to include a signal terminal for signal transmission with the electrical operation tool.

Further, the housing is provided with opposite first side and second side along the length direction of the housing, and the first side and the second side are adjacent accordingly to the end A and the end B, respectively. The tool discharge terminals are arranged on the second side, and the first side partially protrudes outward from an edge.

Compared with the prior art, the advantages of the present invention are as follows: On the one hand, the technical solution provides a data line that comes with the USB interface, which can be used for 3C classes, such as mobile phones, earphones, and other electrical devices for power supply. On the other hand, the technical solution provides latch slots suitable for latch connection to the electrical operation tool. When the latch slots are latched and connected to the electrical operation tool, the tool discharge terminals that are configured in the mobile power supply device match the electrical operation tool to supply power to the electrical operation tool. The area that the data line is embedded in is arranged away from the tool discharge terminals to facilitate the layout of internal structure.

Another purpose of the present invention is to provide a mobile power supply device with a fool-proofing design.

The present invention provides a mobile power supply device, which includes:

a housing that is provided with opposite first side and second side along the length direction;

a cell and a circuit board that are arranged in the housing and electrically connected; and tool discharge terminals that are electrically connected to the circuit board and are suitable for a connection to corresponding terminals of an electrical operation tool.

The tool discharge terminals are arranged on the first side or the second side.

Among the first side and the second side, a side that is away from the tool discharge terminals partially protrudes outward from an edge of the side.

Further, a data line is included, and one end of the data line is electrically connected to the circuit board. The housing has at least one flat surface. The data line is suitable for being flexibly bent and is at least partially embedded in the flat surface. An area that the data line is embedded in is arranged adjacent to a side partially protruding outward from the edge.

Compared with the prior art, the advantage of the present invention is as follows:

The technical solution has a fool-proofing effect.

BRIEF DESCRIPTION OF THE DRAWINGS

In order to more clearly illustrate the specific embodiments of the present invention or the technical solutions in the prior art, the drawings that are required to be used in the specific embodiments or the description of the prior art are briefly introduced. It is obvious that the drawings described below are some embodiments of the present invention. For those having ordinary skill in the art, other drawings can be obtained according to these drawings without creative work.

DETAILED DESCRIPTION OF THE EMBODIMENTS

The technical solutions of the present invention will be clearly and completely described in combination with the drawings. Obviously, the described embodiments are some of the embodiments of the present invention but not all embodiments. Based on the embodiments of the present invention, all other embodiments obtained by those skilled in the art without creative work fall within the scope of protection of the present invention.

As shown in FIGS. 1 to 5, a mobile power supply device 100 includes:

the housing 10;

the cell 90 and the circuit board 60 that are arranged in the housing 10; and the data line 20. One end of the data line 20 is electrically connected to the circuit board 60 and is fixedly connected to the housing 10.

The housing 10 has at least one flat surface.

The data line 20 is suitable for being flexibly bent and is at least partially embedded in the flat surface in a U-shape or an S-shape.

Figure 3:
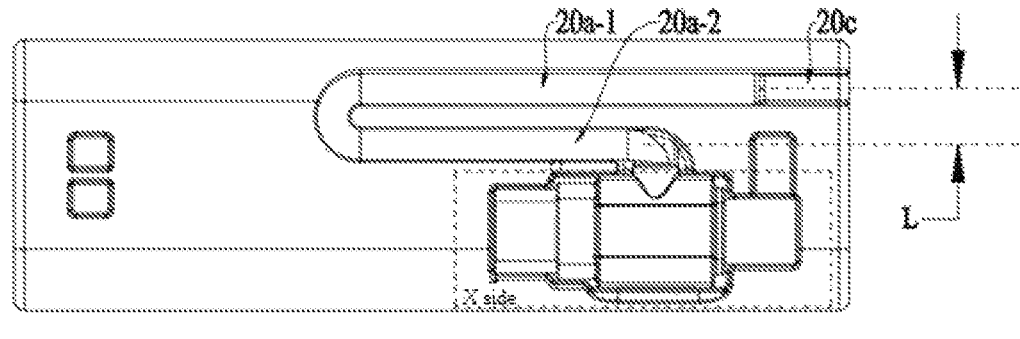
FIG. 3 is a top view of the structure according to the embodiment of the present invention.

Specifically, as shown in FIG. 3, adjacent segments 20*a*-1 and 20*a*-2 of the curved part of the data line are parallel to each other and are arranged in a U-shape.

In addition, the center spacing L of the adjacent segments 20*a*-1 and 20*a*-2 of the curved part of the data line 20 is at least 3 mm; further, the center spacing L of the adjacent segments 20*a*-1 and 20*a*-2 of the curved part of the data line 20 is no more than 9 mm.

Figure 7:
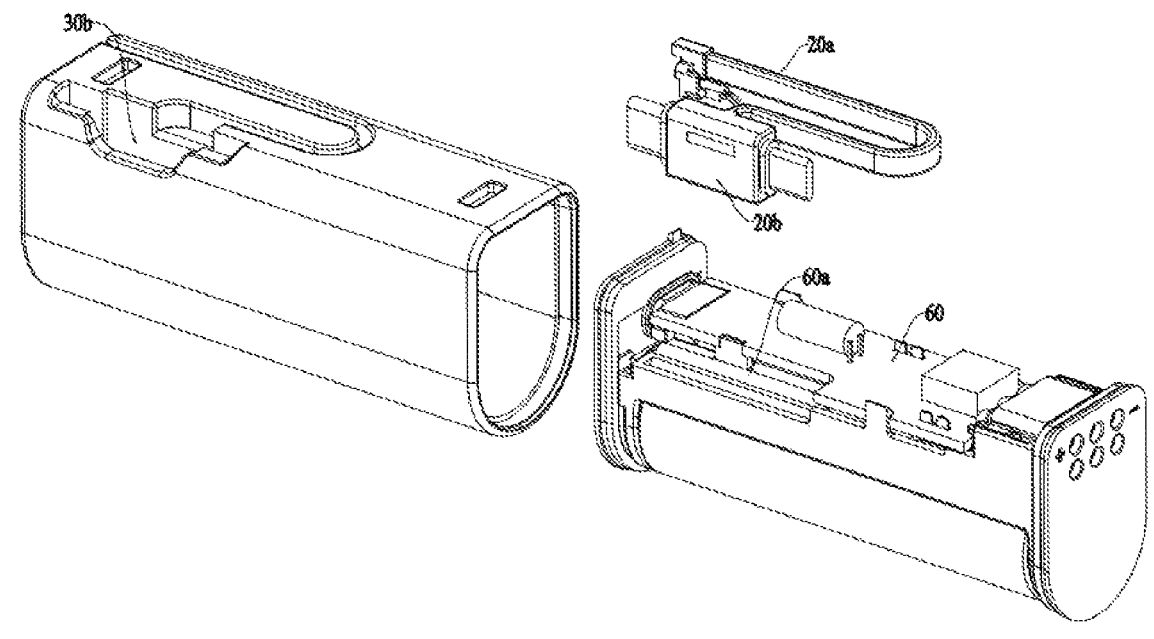
FIG. 7 is an exploded diagram of another structure according to the embodiment of the present invention.
Figure 11:
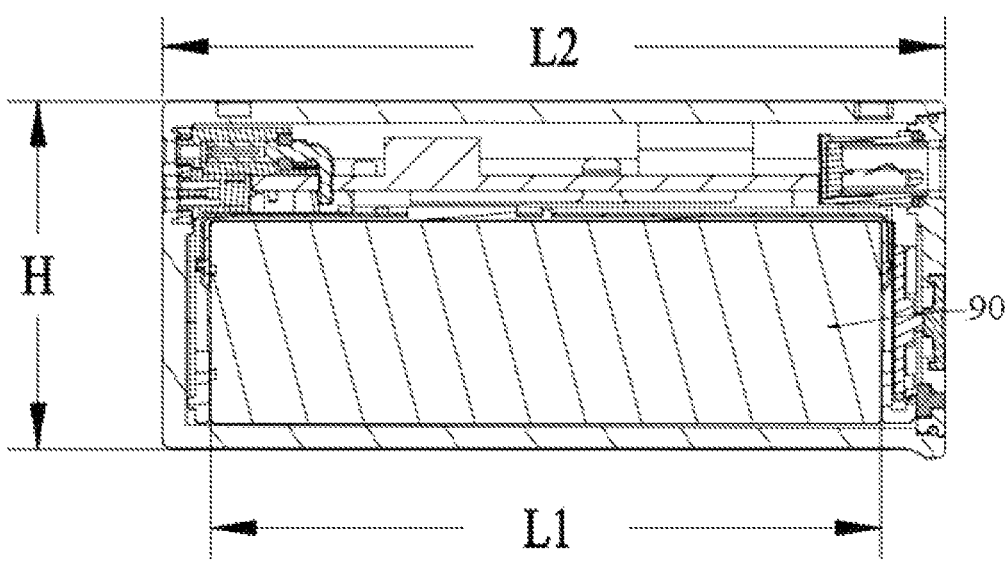
FIG. 11 is a cross-sectional diagram along a long-axis direction according to the embodiment of the present invention.
Figure 12:
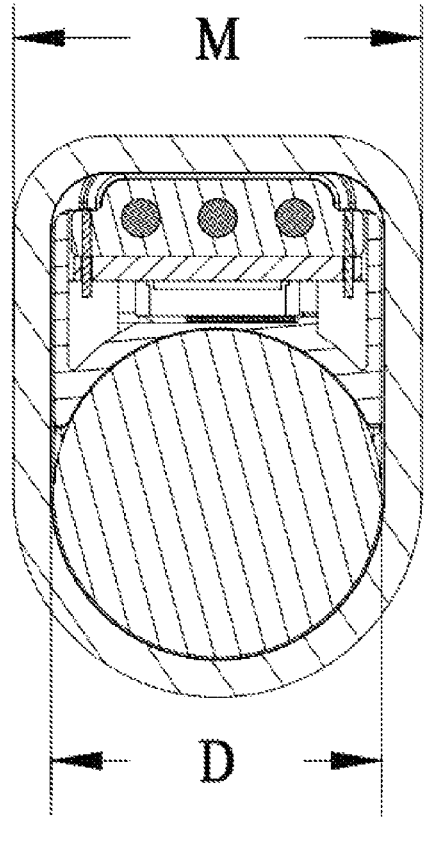
FIG. 12 is a cross-sectional diagram in a transverse direction according to the embodiment of the present invention.

As shown in FIGS. 7, 11, and 12, the width of the circuit board 60 is Y, and the diameter of the cell 90 is D, where Y is less than or equal to 95% of D.

The length of the cell 90 is L3, and the length of the mobile power supply device 100 is L4, where L4 is less than or equal to 1.3 times L3.

The diameter of the cell 90 is D, and the height of the mobile power supply device 100 is M, where M is less than or equal to 1.8 times D.

Specifically, the diameter D of the cell 90 is 21 mm, and the length L3 is 70 mm.

Figure 8:
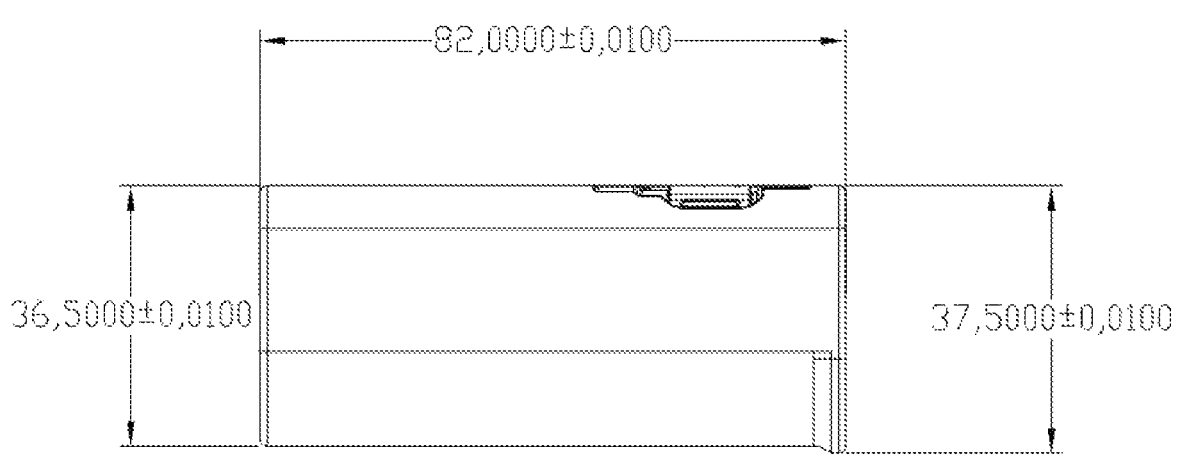
FIG. 8 is the first diagram showing a structure size according to the embodiment of the present invention.
Figure 9:
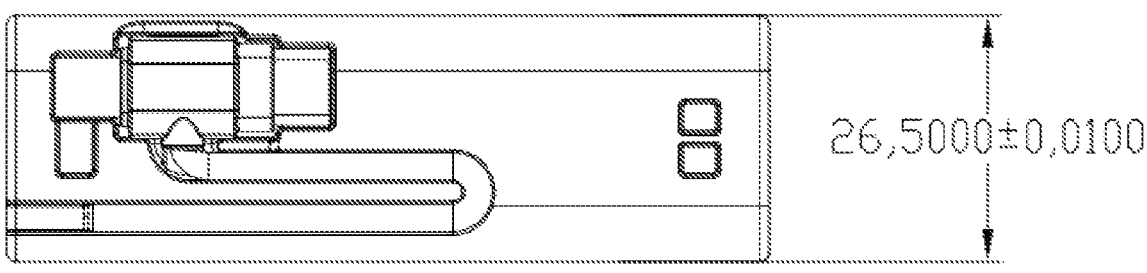
FIG. 9 is the second diagram showing the structure size according to the embodiment of the present invention.

The mobile power supply device 100 with such a structure design has a small overall size, which is convenient to hold and carry. Moreover, the overall size of the optimal solution of the mobile power supply device 100 is 82 mm×26.5 mm×36.5 mm, as shown in FIGS. 8 and 9 specifically.

Figures 1, 2:
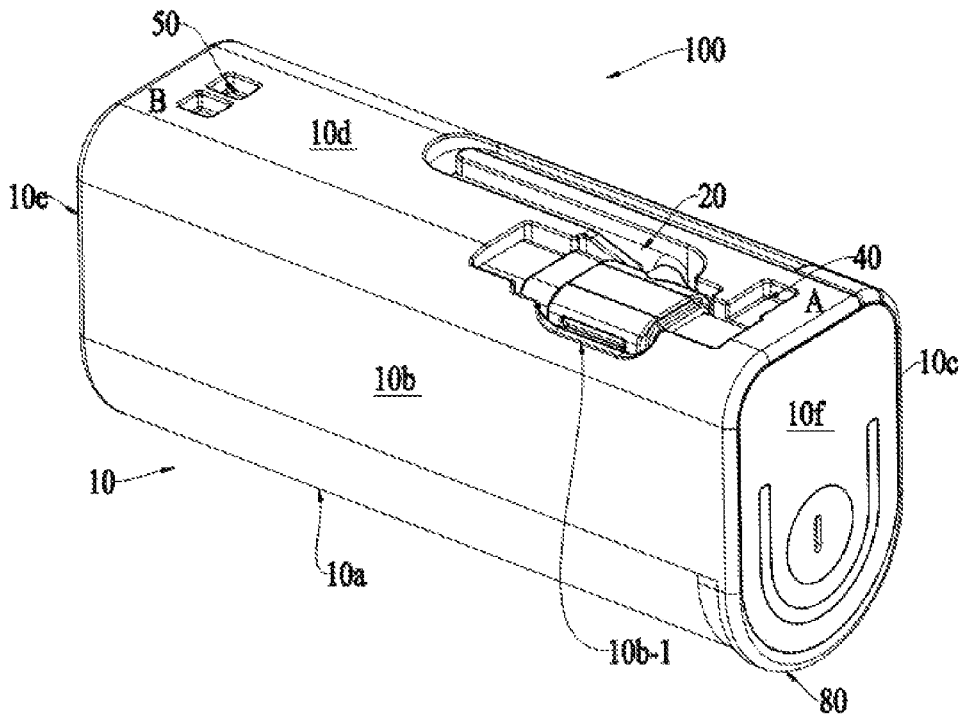
FIG. 1 is a schematic diagram of a structure according to an embodiment of the present invention.
FIG. 2 is an exploded diagram of the structure according to the embodiment of the present invention.

As shown in FIGS. 1 and 2, the data line 20 includes the interface end 20*b*, and the interface end 20*b* at least includes the type-c interface 20*b*-1. When the type-c interface 20*b*-1 is embedded in the flat surface, the socket direction of the type-c interface 20*b*-1 is parallel to the long-axis direction of the housing 10.

The interface end 20*b* further includes at least one Lightning interface 20*b*-2, and the Lightning interface 20*b*-2 is oppositely arranged from the type-c interface 20*b*-1. When the type-c interface 20*b*-1 and the Lightning interface 20*b*-2 are embedded in the flat surface, the central axis line l1 of the two is parallel to the long-axis direction l2 of the housing 10.

The housing 10 is provided with the groove 30 corresponding to the data line 20. After the data line 20 is embedded in the groove 30, the upper surface of the data line 20 is basically flush with the flat surface.

The housing 10 is provided with the groove 30 corresponding to the data line 20, and one end of the data line 20 that is fixedly connected to the housing 10 is provided with the connector 20*c*. A part of the connector 20*c* is embedded in the groove 30 to form a part surface of the flat surface, as shown in FIG. 3.

The adjacent segments 20*a*-1 and 20*a*-2 of the curved part of the data line 20 extend linearly along the long-axis direction l2 of the housing 10.

More specifically, the mobile power supply device 100 includes the data line 20 that is connected to the built-in circuit board 60 at one end. The mobile power supply device 100 includes the curved surface 10*a*, the first side 10*b*, the second side 10*c*, and the third side 10*d*. The first side 10*b* and the second side 10*c* are connected to the curved surface 10*a* and are arranged on opposite sides, and the third side 10*d* is located between the first side 10*b* and the second side 10*c* and extends along the length direction of the mobile power supply device 100, where the third side 10*d* is the flat surface for the data line 20 being embedded. The embedded installation surface of the data line 20 is located at the third side 10*d*, and the embedded installation surface is suitable for the embedded installation of the data line 20.

Specifically, the curved surface 10*a*, the first side 10*b*, the second side 10*c*, and the third side 10*d* are all smooth surfaces extending continuously along the length direction of the mobile power supply device 100.

In addition, it should be noted that the width of the circuit board is Y, and the diameter of the cell is D, where Y is less than or equal to 95% of D. The length of the cell is L3, and the length of the mobile power supply device 100 is L4, where L4 is less than or equal to 1.3 times L3. The diameter of the cell is D, and the height of the mobile power supply device 100 is M, where M is less than or equal to 1.8 times D. Specifically, the diameter D of the cell is preferably 21 mm, and the length L3 is 70 mm. The mobile power supply device 100 with such a structural design has a small overall size, which is convenient to hold and carry. Moreover, the overall size of the optimal solution of the mobile power supply device 100 is 82 mm×26.5 mm×36.5 mm, as shown in FIGS. 8 and 9 specifically.

As shown in FIGS. 1 and 2, the mobile power supply device 100 is further provided with the latch slots (40,50), and the latch slots are suitable for latch connection to an electrical operation tool.

It should be noted that: The mobile power supply device further includes the tool discharge terminals 70, and the tool discharge terminals 70 include at least positive and negative terminals and are suitable to include a signal terminal for signal transmission with the electrical operation tool. When the mobile power supply device is used for the electrical operation tool, the tool discharge terminals 70 are connected to the corresponding terminals of the electrical operation tool and are fixed by the latch connection through the latch slots (40,50).

In addition, the data line 20 includes the lead end 20*a* and the interface end 20*b*, and the interface end 20*b* includes at least a USB interface. An extension surface of the interface end 20*b* along the socket direction of the USB interface is arranged as an X side of the interface end 20*b*, and the X side is parallel or perpendicular to the third side 10*d*.

Specifically, as shown in FIG. 2, the data line 20 includes an initial end of the lead end 20*a* connected to the built-in circuit board and a tail end connected to the interface end 20*b*. The interface end 20*b* is electrically connected to the built-in circuit board through the lead. Specifically, the extension surface along the socket direction of the USB interface, namely the X side of the interface end 20*b*, is parallel to the third side 10*d*, as shown in FIGS. 2 and 3 specifically.

The third side 10*d* is provided with the groove 30*a* for the embedding of the lead end 20*a*, and the groove 30*b* for the embedding of the interface end 20*b*. The lead end 20*a* and the interface end 20*b* are correspondingly embedded in the groove 30*a* and groove 30*b*, respectively, and the data line 20 embedded in the grooves is basically flush with the third side 10*d*. In addition, a position of the first side 10*b* near the interface end 20*b* is provided with the gap 10*b*-1 corresponding to the interface end 20*b*, as shown in FIG. 1. The embedded interface end 20*b* is easy to remove from the gap 10*b*-1, which is convenient for users to operate and use.

Figure 4:
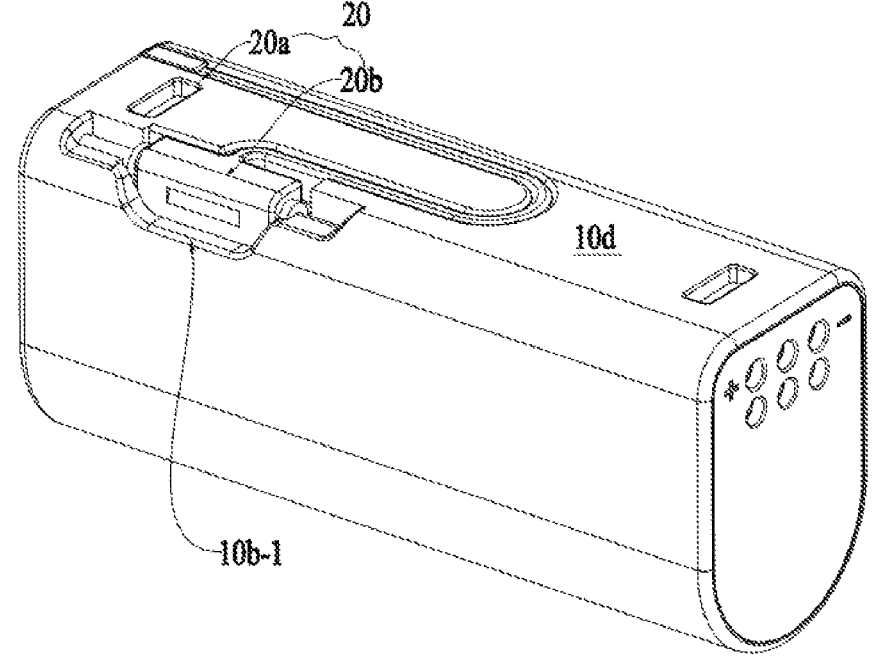
FIG. 4 is a schematic diagram of another structure according to the embodiment of the present invention.
Figure 5:
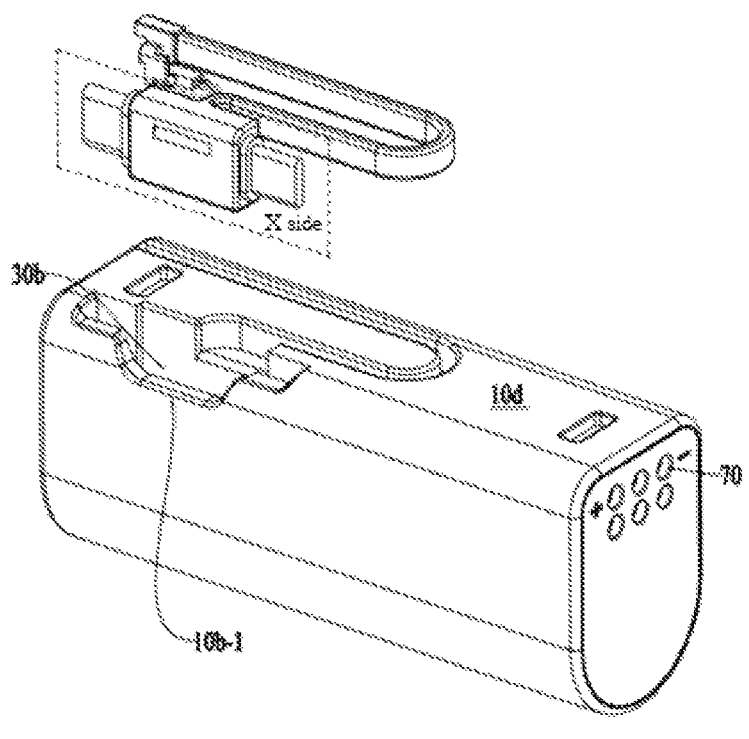
FIG. 5 is an exploded diagram of another structure according to the embodiment of the present invention.

As shown in FIG. 5, the data line 20 includes the initial end of the lead end 20*a* connected to the built-in circuit board, and a tail end connected to the interface end 20*b*. The interface end 20*b* is electrically connected to the built-in circuit board through the lead. Specifically, the extension surface along the socket direction of the USB interface, namely the X side of the interface end 20*b*, is perpendicular to the third side 10*d*, as shown in FIGS. 4 and 5 specifically.

Similarly, the third side 10*d* is provided with the groove 30*a* for the embedding of the lead end 20*a* and the groove 30*b* for the embedding of the interface end 20*b*. The lead end 20*a* and the interface end 20*b* are correspondingly embedded in the groove 30*a* and groove 30*b*, respectively, and the data line 20 embedded in the grooves is basically flush with the third side 10*d*. In addition, a position of the first side 10*b* near the interface end 20*b* is provided with the gap 10*b*-1 corresponding to the interface end 20*b*. As shown in FIGS. 4 and 5, the embedded interface end 20*b* is easy to remove from the gap 10*b*-1, which is convenient for users to operate and use.

Figure 6:
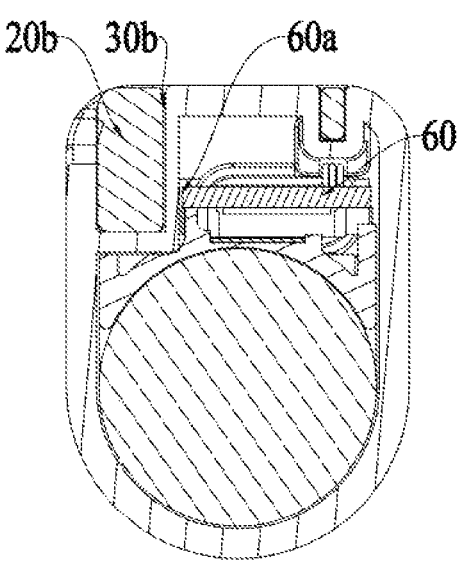
FIG. 6 is a cross-sectional diagram of another structure according to the embodiment of the present invention.

Moreover, when the X side of the interface end 20*b* is perpendicular to the third side 10*d*, the built-in circuit board 60 of the mobile power supply device 100 is provided with the gap 60*a* at the corresponding groove, as shown in FIGS. 6 and 7 specifically. The groove 30*b* extends inward through the gap 60*a*, such that the data line 20 embedded in the groove is basically flush with the third side 10*d*, which is convenient for users to carry and use.

In addition, as shown in FIGS. 1 to 7, another mobile power supply device 100 provided by the present invention includes the data line 20 that is connected to the built-in circuit board 60 at one end. The mobile power supply device 100 includes the curved surface 10*a*, the first side 10*b*, the second side 10*c*, and the third side 10*d*. The first side 10*b* and the second side 10*c* are connected to the curved surface 10*a* and are arranged on opposite sides, and the third side 10*d* is located between the first side 10*b* and the second side 10*c* and extends along the length direction of the mobile power supply device 100. The embedded installation surface of the data line 20 and the latch connecting surface of the mobile power supply device 100 are located on the same outer surface of the mobile power supply device 100.

In the specific embodiment, the embedded installation surface of the data line 20 and the latch connecting surface of the mobile power supply device 100 are located on the same outer surface of the mobile power supply device 100, that is, on the third side 10*d*.

The embedded installation surface is suitable for the embedded installation of the data line 20, and the latch connecting surface is suitable for the latch connection to the electrical operation tool.

As described above, the mobile power supply device further includes the tool discharge terminals 70, and the tool discharge terminals 70 include at least the positive and negative terminals and are suitable to include the signal terminal for the signal transmission with the electrical operation tool. When the mobile power supply device is used for the electrical operation tool, the tool discharge terminals 70 are connected to the corresponding terminals of the electrical operation tool and are fixed by the latch connection through the latch slots (40,50).

In addition, the outer surface of the mobile power supply device 100 is provided with the groove 30 for the embedding of the data line 20, and the data line 20 is flexibly bent and embedded in the groove 30 accordingly.

Specifically, due to the long length of the data line, preferably, the data line is embedded in the corresponding grooves in the U-shape or the S-shape. Moreover, the data lines are flexibly bent and embedded, the spacing L between the adjacent data lines is at least 3 mm and no more than 9 mm. Moreover, in the present technical solution, the data line is preferably configured in the data line with a diameter of 3 mm.

After the data line 20 is embedded in the groove 30, the upper surface of the data line 20 is basically flush with the outer surface of the mobile power supply device 100.

The groove 30*b* for the embedding of the interface end 20*b* of the data line 20 is adjacent to another outer surface of the mobile power supply device 100. Specifically, in the embodiment, the groove 30*b* for the embedding of the interface end 20*b* is adjacent to the first side 10*b* of the mobile power supply device 100, and the outer surface, namely the first side 10*b* is provided with the gap 10*b*-1 corresponding to the interface end 20*b*, as shown in FIGS. 4 and 5. The embedded interface end 20*b* is easy to remove through the gap 10*b*-1, which is convenient for users to operate and use.

The embedded installation surface of the data line 20 and the latch connecting surface of the mobile power supply device are located on the third side 10*d* of the mobile power supply device.

In addition, the present invention further provides a mobile power supply device suitable for fool-proofing, including:

the curved surface 10*a;* the first side 10*b* and the second side 10*c* that are connected to the curved surface 10*a* and are arranged on opposite sides;

the third side 10*d* that is located between the first side 10*b* and the second side 10*c* and extends along the length direction of the mobile power supply device 100; and the fourth side 10*e* and the fifth side 10*f* that are located at two opposite ends of the length direction of the mobile power supply device 100.

The fourth side 10*e* and the fifth side 10*f* are different in shape and size.

As described above, the mobile power supply device 100 further includes the tool discharge terminals 70, and the tool discharge terminals 70 include at least the positive and negative terminals and are suitable to include the signal terminal for the signal transmission with the electrical operation tool. When the mobile power supply device is used for the electrical operation tool, the tool discharge terminals 70 are connected to the corresponding terminals of the electrical operation tool and are fixed by the latch connection through the latch slots (40,50).

In order to facilitate the matching and use of the mobile power supply device 100 with the electrical operation tool, the fool-proofing design is specially adopted. The shape and size of the two end sides of the length direction of the mobile power supply device 100 are designed to be different. Specifically, the fourth side 10*e* and the fifth side 10*f* are different in shape and size.

In addition, one of the fourth side 10*e* and the fifth side 10*f* is provided with an electrical connector connected to the built-in circuit board 60 of the mobile power supply device 100. The electrical connector is configured to be electrically connected to the electrical devices such that the electric power from the cell can be supplied to the electrical devices through the electrical connector.

The fifth side 10*f* or the fourth side 10*e*, as opposed to the fourth side 10*e* or the fifth side 10*f* configured with the electrical connector, partially protrudes outward from the edge, as shown by the reference numeral 80 in FIGS. 1 and 2.

Specifically, the protruding part is located at the edge of the curved surface 10*a*.

In addition, it should be noted that:

The interface end 20*b* of the mobile power supply device 100 has two interfaces, and the two interfaces are arranged at two opposite ends. Preferably, the two interfaces are arranged on the same straight line, such that the user can use the mobile power supply device 100 to supply electricity for two electrical devices, such as charging two mobile phones. It is common in the market that two interfaces are arranged on the adjacent end surfaces of the interface end 20*b*. In this way, interference often occurs when two electrical devices are charged, and only one electrical device can be charged and used.

Referring to FIGS. 1 to 7, the mobile power supply device 100 includes:

the housing 10;

the cell 90 and the circuit board 60 that are arranged in the housing 10;

the latch slots (40,50) that are suitable for the latch connection to the electrical operation tool; and the data line 20. One end of the data line 20 is electrically connected to the circuit board 60.

The housing 10 has at least one flat surface.

The data line 20 is suitable for being flexibly bent and is at least partially embedded in the flat surface, and the latch slots (40,50) are located on the flat surface.

Figure 13:
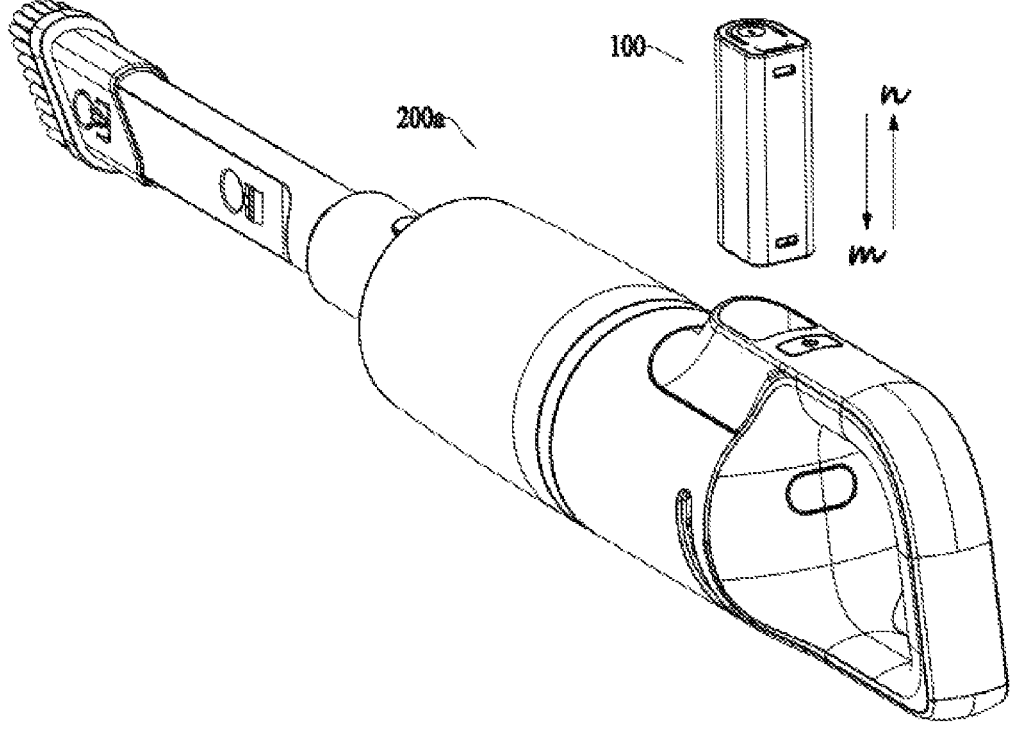
FIG. 13 is an assembly diagram of a mobile power supply device and a cleaning device according to the embodiment of the present invention.
Figure 14:
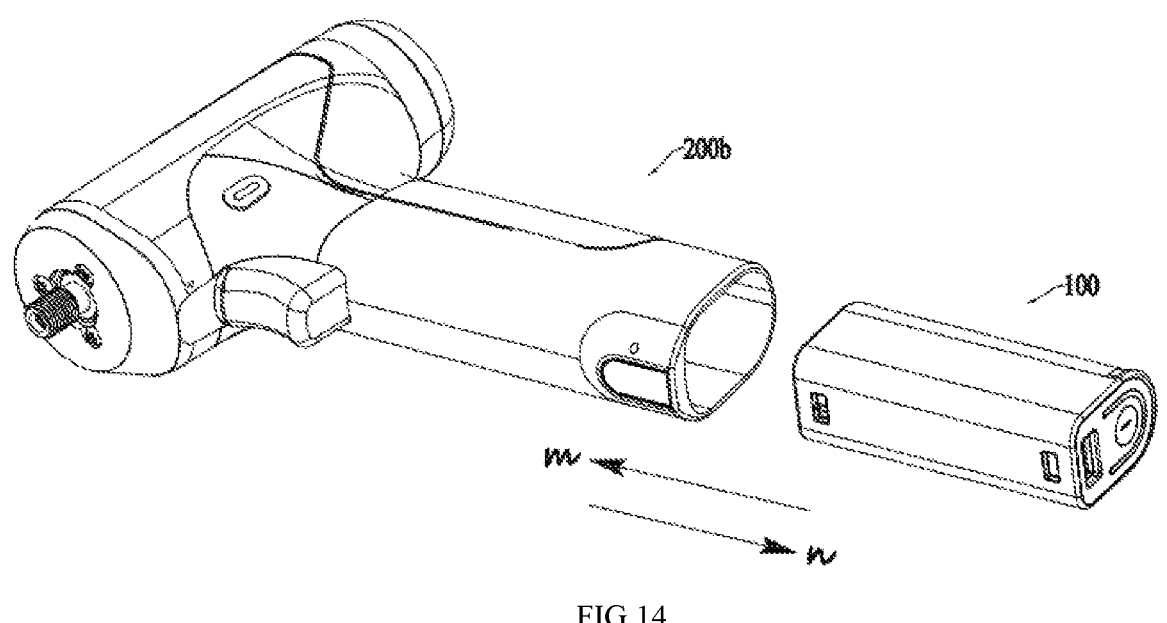
FIG. 14 is an assembly diagram of the mobile power supply device and an electric tool device according to the embodiment of the present invention.

The electrical operation tool is the cleaning device 200*a* described in FIG. 13, such as the vacuum cleaner, etc., or the electric tool device 200*b* described in FIG. 14, such as a drill, etc. It is evident that the electrical operation tools are not limited herein, but also can be other electrical operation tools.

Further, the latch slots (40,50) include the first latch slot 40 and the second latch slot 50.

The first latch slot 40 is suitable for the latch connection to the first electrical device.

The second latch slot 50 is suitable for the latch connection to the second electrical device.

When the first latch slot 40 and the second latch slot 50 are latched and connected to the electrical devices corresponding to the first latch slot 40 and the second latch slot 50, the two do not interfere with each other.

Specifically, as shown in FIG. 13, when the mobile power supply device 100 matches and supplies the cleaning device 200*a*, the mobile power supply device 100 is inserted into the cleaning device 200*a* along the latch path m, and the first latch slot 40 at the lower end is latched and connected to the cleaning device 200*a*. At this time, the second latch slot 50 is not on the linear path segment of the latch and do not interfere and interact with the first latch slot 40 to prevent it from affecting the mobile power supply device 100 and allowing the supply of power to the cleaning device 200*a*. Similarly, when the mobile power supply device 100 is disengaged from the cleaning device 200*a* along the unlocking disengagement path n, the second latch slot 50 is not on the linear path segment of the latch and do not interfere and interact with the first latch slot 40, which will not affect the connection between mobile power supply device 100 and the cleaning device 200*a*.

As shown in FIG. 8, when the mobile power supply device 100 matches and supplies the electric tool device 200*b*, the mobile power supply device 100 is inserted into the electric tool device 200*b* along the latch path m, and the second latch slot 50 at the tail end is latched and connected to the electric tool device 200*b*. At this time, the first latch slot 40 is on the linear path segment of the latch. Therefore, it is necessary to arrange a structure that the latch structure in the electric tool device 200*b* does not match the first latch slot 40 but only matches the second latch slot 50, such that the first latch slot 40 and the second latch slot 50 do not interfere and will not affect the connection between mobile power supply device 100 and the electric tool device 200*b*. Similarly, when the mobile power supply device 100 is disengaged from the electric tool device 200*b* along the unlocking disengagement path n, the first latch slot 40 does not match the latch structure in the electric tool device 200*b* and does not interfere with the second latch slot 50, which will not affect that the connection between mobile power supply device 100 and the electric tool device 200*b*.

Further, the data line 20 includes the interface end 20*b*, and the interface end 20*b* includes at least the USB interface. The housing 10 is provided with the groove 30*b* corresponding to the interface end 20*b*, and the groove 30*b* is communicated with the latch slot 40 adjacent to the groove 30*b*.

The length direction of the latch slot 40 is perpendicular to the length direction of the groove 30*b* that is adjacent to the latch slot 40.

In addition, the first latch slot 40 and the second latch slot 50 are distributed at two opposite ends of the flat surface, respectively.

As shown in FIGS. 1 to 7, the mobile power supply device 100 includes the housing 10;

the cell 90 and the circuit board 60 that are arranged in the housing 10;

the tool discharge terminals 70 that are electrically connected to the circuit board 60 and are suitable for the connection to the corresponding terminals of the electrical operation tool;

the latch slots (40,50) that are suitable for the latch connection to the electrical operation tool; and the data line 20. One end of the data line 20 is electrically connected to the circuit board 60.

The housing 10 has at least one flat surface.

The data line 20 is suitable for being flexibly bent and is at least partially embedded in the flat surface.

The area that the data line 20 is embedded in is arranged away from the tool discharge terminals 70.

Specifically, the flat surface refers to the flat surface shown by 10*d* in FIGS. 1 and 2.

Further, the flat surface is provided with opposite end A and end B along the length direction of the flat surface, the data line 20 is arranged near the end A, and the tool discharge terminals 70 are arranged on the side adjacent to the end B.

The tool discharge terminals 70 include at least the positive and negative terminals and are suitable to include the signal terminal for the signal transmission with the electrical operation tool.

The housing 10 is provided with the opposite first side and second side along the length direction of the housing 10, namely the fourth side 10*e* and the fifth side 10*f*. The first side and the second side are adjacent accordingly to the end A and the end B, respectively. The tool discharge terminals 70 are arranged on the second side, and the first side partially protrudes outward from the edge.

Figure 10:
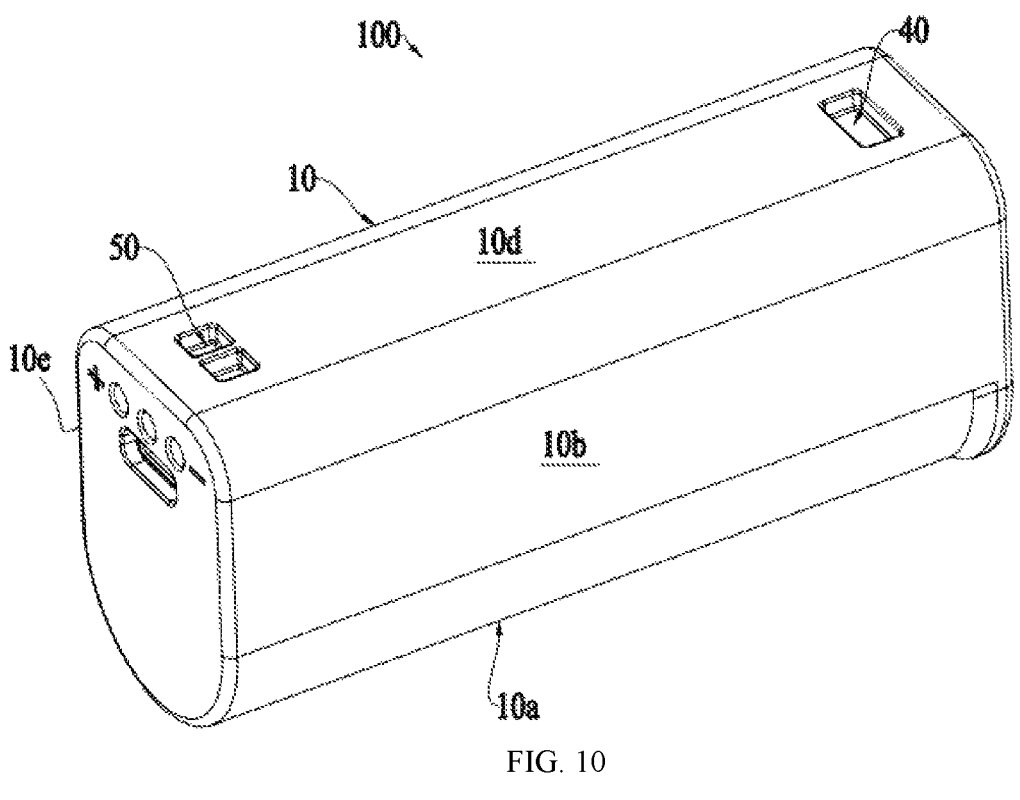
FIG. 10 is a schematic diagram of another structure according to the embodiment of the present invention.

Further referring to FIG. 10, the mobile power supply device 100 includes: the housing 10 that is provided with the opposite first side and second side along the length direction of the housing 10, namely the fourth side 10*e* and the fifth side 10*f*;

the cell 90 and the circuit board 60 that are arranged in the housing 10 and electrically connected; and the tool discharge terminals 70 that are electrically connected to the circuit board 60 and are suitable for the connection to the corresponding terminals of the electrical operation tool.

The tool discharge terminals 70 are arranged on the first side or the second side.

Among the first side and the second side, a side that is away from the tool discharge terminals 70 partially protrudes outward from the edge of the side.

In addition, the data line 20 is further included, one end of the data line 20 is electrically connected to the circuit board 60. The housing 10 has at least one flat surface. The data line 20 is suitable for being flexibly bent and is at least partially embedded in the flat surface. The area that the data line is embedded in is arranged adjacent to the side partially protruding outward from the edge.

Finally, it should be noted that the above embodiments are used only to illustrate the technical solutions of the present invention and not to limit the present invention. Although the present invention is explained in detail with reference to the above-mentioned embodiments, those having ordinary skill in the art should understand that they can still modify the technical solutions recited in the above embodiments or make equivalent replacements of some or all of the technical features. And these modifications or replacements do not make the essence of the corresponding technical solutions depart from the scope of the technical solutions of the embodiments in the present invention.

What is claimed is:

1. A mobile power supply device, comprising:
a housing;
a cell and a circuit board, wherein the cell and the circuit board are arranged in the housing; and
a data line, wherein one end of the data line is electrically connected to the circuit board and is fixedly connected to the housing,
wherein the housing has at least one flat surface,
the data line is configured for being flexibly bent and is at least partially embedded in the flat surface in a U-shape or an S-shape,
wherein an external surface of the housing comprises a groove formed in said U-shape or said S-Shape in which said data line is embedded and in which said data line adopts said U-shape or said S-Shape.

2. The mobile power supply device according to claim 1, wherein adjacent segments of a curved part of the data line are parallel to each other.

3. The mobile power supply device according to claim 1, wherein a center spacing L of adjacent segments of a curved part of the data line is at least 3 mm.

4. The mobile power supply device according to claim 1, wherein a center spacing L of adjacent segments of a curved part of the data line is less than or equal to 9 mm.

5. The mobile power supply device according to claim 1, wherein a width of the circuit board is Y, and a diameter of the cell is D, wherein Y is less than or equal to 95% of D.

6. The mobile power supply device according to claim 1, wherein a length of the cell is L3, and a length of the mobile power supply device is L4, wherein L4 is less than or equal to 1.3 times L3.

7. The mobile power supply device according to claim 1, wherein a diameter of the cell is D, and a height of the mobile power supply device is M, wherein M is less than or equal to 1.8 times D.

8. The mobile power supply device according to claim 5, wherein a diameter D of the cell is 21 mm, and a length L3 of the cell is 70 mm.

9. The mobile power supply device according to claim 1, wherein the data line comprises an interface end, and the interface end at least comprises a type-c interface; when the type-c interface is embedded in the flat surface, a socket direction of the type-c interface is parallel to a long-axis direction of the housing.

10. The mobile power supply device according to claim 9, wherein the interface end further comprises at least one Lightning interface, and the Lightning interface is oppositely arranged to the type-c interface; when the type-c interface and the Lightning interface are embedded in the flat surface, a central axis line of the type-c interface and the Lightning interface is parallel to the long-axis direction of the housing.

11. The mobile power supply device according to claim 1, wherein after the data line is embedded in the groove, an upper surface of the data line is basically flush with the flat surface.

12. The mobile power supply device according to claim 1, wherein one end of the data line fixedly connected to the housing is provided with a connector; and a part of the connector is embedded in the groove to form a part surface of the flat surface.

13. The mobile power supply device according to claim 1, wherein adjacent segments of a curved part of the data line extend linearly along a long-axis direction of the housing.

14. A mobile power supply device, comprising:
a housing;
a cell and a circuit board, wherein the cell and the circuit board are arranged in the housing;
latch slots, wherein the latch slots are configured for a latch connection to an electrical operation tool; and
a data line, wherein one end of the data line is electrically connected to the circuit board;
wherein the housing has at least one flat surface;
the data line is configured for being flexibly bent and is at least partially embedded in the flat surface, and the latch slots are located on the flat surface,
wherein an external surface of the housing comprises a groove formed in a U-shape or an S-Shape in which said data line is embedded and in which said data line adopts said U-shape or said S-Shape.

15. The mobile power supply device according to claim 14, wherein the latch slots comprise a first latch slot and a second latch slot;
the first latch slot is configured for the latch connection to a first electrical device;

the second latch slot is configured for the latch connection to a second electrical device;

when the first latch slot and the second latch slot are latched and connected to electrical devices corresponding to the first latch slot and the second latch slot, the first latch slot and the second latch slot do not interfere with each other.

16. The mobile power supply device according to claim 14, wherein the data line comprises an interface end, and the interface end comprises at least one universal serial bus (USB) interface; the groove is communicated with a latch slot adjacent to the groove.

17. The mobile power supply device according to claim 16, wherein a length direction of the latch slot is perpendicular to a length direction of the groove adjacent to the latch slot.

18. The mobile power supply device according to claim 15, wherein the first latch slot and the second latch slot are distributed at two opposite ends of the flat surface, respectively.

19. A mobile power supply device, comprising:

a housing;

a cell and a circuit board, wherein the cell and the circuit board are arranged in the housing;

tool discharge terminals, wherein the tool discharge terminals are electrically connected to the circuit board and are configured for a connection to corresponding terminals of an electrical operation tool; and a data line, wherein one end of the data line is electrically connected to the circuit board;

wherein the housing has at least one flat surface;

the data line is configured for being flexibly bent and is at least partially embedded in the flat surface, an area is arranged away from the tool discharge terminals, wherein the data line is embedded in the area, and an external surface of the housing comprises a groove formed in a U-shape or an S-Shape in which said data line is embedded and in which said data line adopts said U-shape or said S-Shape.

20. The mobile power supply device according to claim 19, wherein the flat surface is provided with a first end and a second end along a length direction of the flat surface, wherein the first end and the second end are opposite to each other; the data line is arranged near the first end, and the tool discharge terminals are arranged on a side adjacent to the second end.

21. The mobile power supply device according to claim 19, wherein the tool discharge terminals comprise at least positive and negative terminals and a signal terminal, wherein the signal terminal is configured for a signal transmission with the electrical operation tool.

22. The mobile power supply device according to claim 20, wherein the housing is provided with a first side and a second side along a length direction of the housing, wherein the first side and the second side are opposite to each other, and the first side and the second side are adjacent accordingly to the first end and the second end, respectively; the tool discharge terminals are arranged on the second side, and the first side partially protrudes outward from an edge.

23. A mobile power supply device, comprising:

a housing, wherein the housing is provided with a first side and a second side along a length direction of the housing, and the first side and the second side are opposite to each other;

a cell and a circuit board, wherein the cell and the circuit board are arranged in the housing and electrically connected;

a data line; and tool discharge terminals, wherein the tool discharge terminals are electrically connected to the circuit board and are configured for a connection to corresponding terminals of an electrical operation tool;

wherein the tool discharge terminals are arranged on the first side or the second side;

among the first side and the second side, a side away from the tool discharge terminals partially protrudes outward from an edge of the side, and an external surface of the housing comprises a groove formed in a U-shape or an S-Shape in which said data line is embedded and in which said data line adopts said U-shape or said S-Shape.

24. The mobile power supply device according to claim 23, further comprising a data line, wherein one end of the data line is electrically connected to the circuit board; the housing has at least one flat surface; the data line is configured for being flexibly bent and is at least partially embedded in the flat surface; and an area is arranged adjacent to the side partially protruding outward from the edge, wherein the data line is embedded in the area.

* * * * *